(12) United States Patent
Rozman et al.

(10) Patent No.: US 7,859,230 B2
(45) Date of Patent: Dec. 28, 2010

(54) VOLTAGE REGULATION TO REDUCE RIPPLE IN A POWER GENERATION SYSTEM

(75) Inventors: Gregory I. Rozman, Rockford, IL (US); Kevin A. Dooley, Mississauga (CA)

(73) Assignee: Pratt & Whitney Canada Corp, Longuellil, Quebec (CA)

( * ) Notice: Subject to any disclaimer, the term of this patent is extended or adjusted under 35 U.S.C. 154(b) by 538 days.

(21) Appl. No.: 11/964,122

(22) Filed: Dec. 26, 2007

(65) Prior Publication Data

US 2009/0167255 A1 Jul. 2, 2009

(51) Int. Cl.
*H02P 9/14* (2006.01)
*H02P 9/10* (2006.01)

(52) U.S. Cl. .................. 322/46; 322/24; 322/28
(58) Field of Classification Search .......... 322/22, 322/23, 24, 25, 28, 45, 46, 56; 363/54, 128
See application file for complete search history.

(56) References Cited

U.S. PATENT DOCUMENTS

| | | | |
|---|---|---|---|
| 5,198,972 A | 3/1993 | Lafuze | |
| 5,218,520 A | 6/1993 | Rozman et al. | |
| 5,777,459 A * | 7/1998 | Bansal et al. | 322/47 |
| 6,486,638 B1 * | 11/2002 | Sumimoto et al. | 322/28 |
| 7,050,313 B2 * | 5/2006 | Huang et al. | 363/54 |
| 7,193,872 B2 * | 3/2007 | Siri | 363/95 |
| 7,400,117 B1 * | 7/2008 | Rozman et al. | 322/45 |
| 7,521,906 B2 * | 4/2009 | Rozman et al. | 322/45 |
| 2006/0087782 A1 | 4/2006 | Michalko et al. | |

FOREIGN PATENT DOCUMENTS

EP   1 764 908 A1   3/2007

* cited by examiner

*Primary Examiner*—Nicholas Ponomarenko
(74) *Attorney, Agent, or Firm*—Ogilvy Renault LLP

(57) ABSTRACT

Methods and systems are disclosed for reducing alternating current ripples in direct current electrical power generation systems with one or more regulated permanent magnet machines. Ripple suppression is achieved, in one aspect, by modulating the control current of a regulated permanent magnet machine.

14 Claims, 5 Drawing Sheets

VOLTAGE REGULATION TO REDUCE RIPPLE IN A POWER GENERATION SYSTEM

TECHNICAL FIELD

The invention relates generally to power generation and, in particular, to regulating voltage in power generation systems with a regulated permanent magnet machine.

BACKGROUND OF THE ART

The output impedance of permanent magnet generators varies as a function of feeder length and internal construction and is generally not perfectly balanced. More specifically the output impedance of regulated permanent magnet machines (PMMs) is more sensitive to the feeder length and internal construction due to very low machine inductances. Unbalanced output impedance results in a ripple on the direct current bus. The ripple has a frequency which is related to the frequency of the generator (alternator). The direct current (DC) bus ripple can be controlled by increasing the size of the DC bus capacitor. However, this approach results in weight increase of the electric power generation system. U.S. Pat. Nos. 5,218,520 and 7,099,165 disclose approaches for controlling DC bus ripple by modulating generator output. Room for improvement exists.

SUMMARY

According to an aspect, there is provided a ripple suppression circuit for regulating a direct current (DC) power converted from an alternating current (AC) power produced by a regulated permanent magnet generator (PMG) having a control winding. The DC power has voltage or current ripple. The ripple suppression circuit comprises: a synchronization unit for deriving a synchronization signal; a synchronous compensator for determining, using the synchronization signal, a compensation signal to at least partly suppress the voltage or current ripple; a voltage regulator control unit for producing a current modulation signal for modulating a control current in the control winding in response to the compensation signal in order to adjust the AC power and hence also to regulate the DC power.

According to another aspect, there is provided a ripple suppression circuit for regulating a direct current (DC) power converted from an alternating current (AC) power produced by a regulated permanent magnet generator (PMG) having a control winding. The DC power has voltage or current ripple. The ripple suppression circuit comprises: means for deriving a synchronization signal; means for determining, using the synchronization signal, a compensation signal in a synchronous reference frame to at least partly suppress the voltage or current ripple; and means for producing a current modulation signal for modulating current in the control winding in response to the compensation signal in order to adjust the alternating current power and hence also to regulate the DC power.

According to another aspect, there is provided a method for regulating a direct current (DC) power converted from an alternating current (AC) power produced by a regulated permanent magnet generator (PMG) having a control winding. The DC power has voltage or current ripple. The method comprises: deriving a synchronization signal; determining, using the synchronization signal, a compensation signal in a synchronous reference frame to at least partly suppress the voltage or current ripple; and producing a current modulation signal for modulating a control current in the control winding in response to the compensation signal in order to adjust the alternating current power and hence also to regulate the DC power.

According to another aspect, there is provided a direct current electric generator comprising: a regulated permanent magnet generator (PMG) drivingly connected to a prime mover to produce alternating current power, the regulated PMG comprising control windings through which a control current has an effect on the alternating current power; a rectifier arranged to convert the alternating current power into a direct current power having a voltage or current ripple; and a ripple suppression circuit for regulating the direct current power. The ripple suppression circuit comprises: a synchronization unit for deriving a synchronization signal; a synchronous compensator for determining, using the synchronization signal, a compensation signal to at least partly suppress the voltage or current ripple; and a voltage regulator control unit for producing a current modulation signal for modulating current in the control winding in response to the compensation signal in order to adjust the alternating current power and hence also to regulate the DC power.

Further details of these and other aspects will be apparent from the detailed description and figures included below.

DESCRIPTION OF THE DRAWINGS

Reference is now made to the accompanying figures, in which.

DETAILED DESCRIPTION

Pending U.S. patent application Ser. No. 11/533,548, filed Sep. 20, 2006 and entitled Modulation Control of Power Generation System, describes a power generation system and method preferably employing one or more alternators of the general type described in U.S. Pat. No. 7,262,539. The system employs using a control winding in the alternator's stator to vary a saturation level of a portion of the stator to thereby modulate power output in a desired manner. The present description is directed to reducing ripple, and is described generally with reference to such a system.

Figure 1:
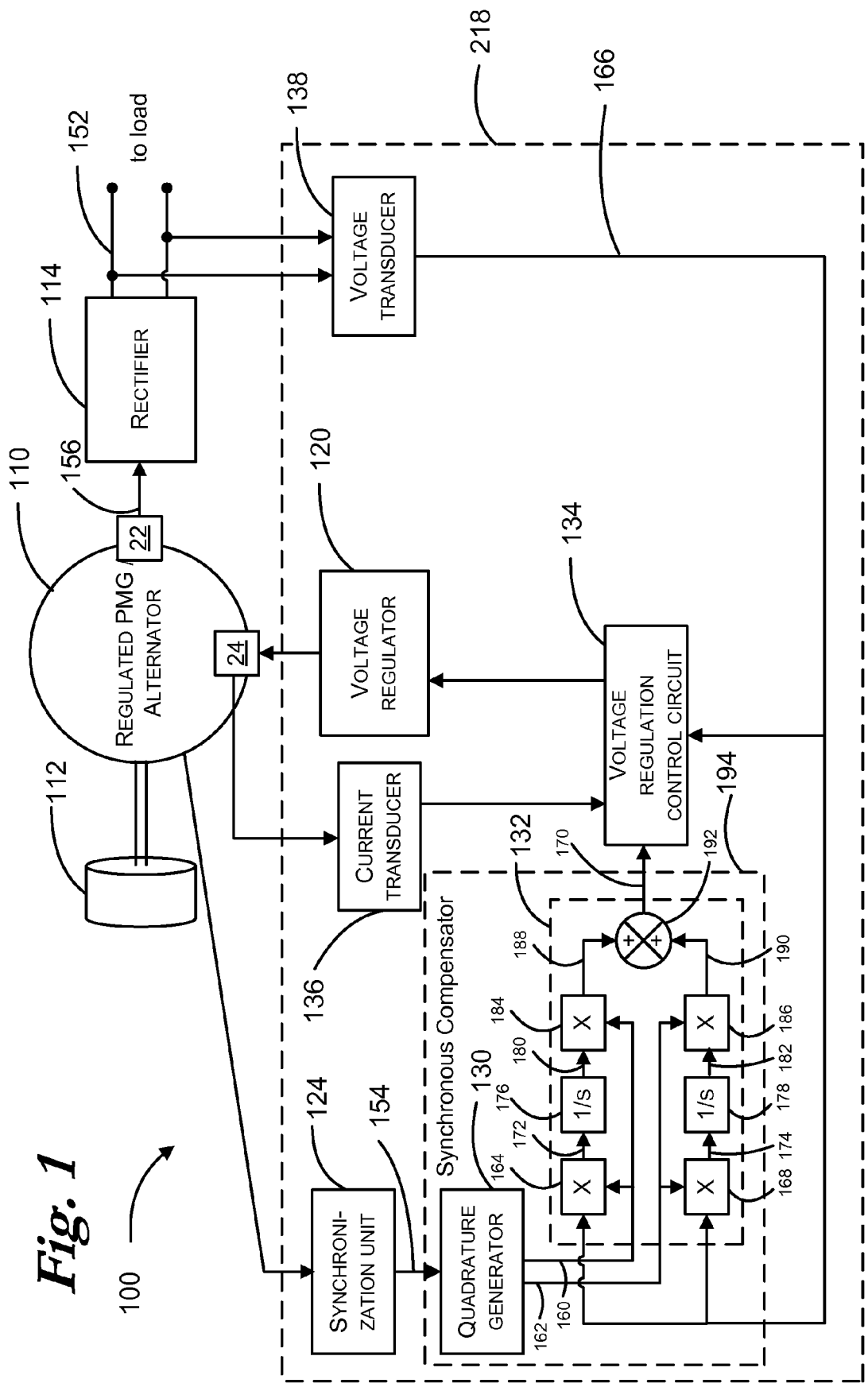
FIG. 1 is a block diagram showing a direct current electric generator including an active ripple suppression circuit, according to an embodiment described herein.

FIG. 1 shows a generator system 100 including a ripple suppression circuit 218 in accordance with the present teachings for reducing ripples in the generated electrical power 152. Ripple suppression is achieved by varying how a portion of an alternator 110 is saturated, as will be described herein in reference to FIGS. 1 to 4. The alternator 110 is drivingly connected to a prime mover 112, such as a gas turbine engine, a windmill or water turbine, or other suitable source of mechanical power. The alternator 110 may be a permanent magnet electric machine, also referred to as a regulated permanent magnet generator (PMG), including power windings 22 and control windings 24, single or multiphase. The stator of alternator 11 may be provided in accordance with U.S. Pat. No. 7,262,539.

Rotation of the rotor relative to the stator of the alternator induces an AC power 156 in the alternator power winding(s) 22. The AC power 156 is rectified using a rectifier 114 to produce DC power 152. The rectifier 114 typically uses a bridge-type configuration known in the art. As described in co-pending U.S. patent application Ser. No. 11/533,548, in use the alternator output DC level may be modulated, by varying current levels supplied to the control winding(s) 24 to vary stator saturation, to thereby provide an alternator output which, when appropriately conditioned, may be provided to a load as either DC or AC having a selected desired frequency or frequencies. In this example, the output is provided to the load directly as DC, without further conditioning or inversion. Further details of the system may be found in co-pending U.S. patent application Ser. No. 11/533,548, and thus only aspects of such system relevant to the present description will be addressed hereinbelow.

The resultant DC power 152 generally presents an AC ripple, also referred to as a voltage or current ripple, which could be smoothed by passive techniques such as filtering, for example. However, the AC ripple is suppressed herein using an active ripple suppression circuit 218. The ripple suppression circuit 218 uses the known ripple pattern having a phase and a frequency which are synchronized with the ripple to be suppressed using a feedback on the alternator phase. Accordingly, the ripple suppression circuit 218 comprises a synchronization unit 124 which derives a synchronization signal 154. In one embodiment (FIGS. 1 and 2), the synchronization unit 124 reads and uses the position of the rotor of the PMG in real time to determine synchronization signal 154. In another embodiment (FIGS. 3 and 4), synchronization unit 124 reads and uses phase voltages of the stator of the PMG in real time to determine synchronization signal 154.

As described further in co-pending U.S. patent application Ser. No. 11/533,548, control of the generated DC power 152 is achieved by varying control current 150 provided by the voltage regulator 120 to the control windings 24 of the alternator 110, varying stator saturation level such that the alternator AC output power 156 induced in the power windings 22 varies proportionally to the control current 150 in the control windings 24, as described above. That is, as the control current 150 in the control windings 24 is increased, the absolute value of the alternator output AC power in the power windings 22 is increased in amplitude proportionally according to the principles discussed above. By varying the control current 150 provided to the control windings 24 in a desired pattern and at a level sufficient to saturate at least a portion of the stator, at a desired frequency and phase, the absolute value of the amplitude of the AC power 156 in the power windings 22 of the alternators will vary according to the same general pattern and frequency.

The control current 150 is modulated as controlled by the voltage regulation control circuit 134 and according to the determined alternator phase and known ripple pattern, such that, once the AC power 156 from the power windings 22 of the alternator 110 is rectified from AC to DC by the rectifier 114, the ripple on the DC output power 152 is suppressed or at least reduced. High frequency filtering may be applied to the rectified DC power signal to eliminate any ripple remaining in the rectified power.

In accordance with the present teachings, ripple suppression circuit 218 further comprises a synchronous compensator 194 which in turn comprises a quadrature generator 130 and harmonic compensation unit 132. Quadrature generator 130 receives the synchronization signal 154 and generates a first signal 160 and a second signal 162 each having a frequency corresponding to the ripple frequency. The second signal 162 is the phase quadrature of the first signal 160. A harmonic compensation unit 132 receives the first and second signals 160, 162 and produces a compensation signal 170 having a frequency corresponding to the ripple frequency and having a phase corresponding to the ripple phase.

A voltage regulation control circuit 134 controls the voltage regulator 120 according to the compensation signal 170 and with proportional integral control loops with feedback on the control current as read by a current transducer 136 and on the output DC power voltage as read by a voltage transducer 138.

Signals 160 and 162 are in-phase and phase quadrature components respectively of the harmonic to be eliminated. The in-phase reference is essentially a sinusoidal signal having the same frequency as the ripple of DC power 152. The quadrature reference is essentially a cosinusoidal signal having the same frequency as the in-phase reference. The voltage transducer 138 connected to the DC output bus reads the voltage of the DC power 152. The read voltage 166 comprises a DC level and the ripple.

The harmonic compensation unit 132 includes two paths. In the first path, the first in-phase signal 160 is input to the first input port of multiplier 164 while the voltage 166 read by the voltage transducer 138 is input to the second input port of multiplier 164. Multiplier 164 multiplies the first in-phase signal 160 and the read voltage 166 placing the result on line 172. This signal contains a DC component reflecting the amplitude and phase of the ripple and is fed into the conditioning unit 176.

The purpose of the conditioning unit 176 is to eliminate all AC components from the signal on line 172 leaving only the DC component reflecting the phase and amplitude of the ripple. It is a further purpose of the conditioning unit 176 to enhance this component to a desired amplitude level. In one embodiment, the conditioning unit 176 comprises an integrator. However it should be noted that conditioning unit 176 along with conditioning unit 178 could also comprise a low pass filter followed by a proportional integrator unit.

Conditioning unit 176 produces its output on line 180 which feeds the first input port of multiplier 184. Multiplier 184 takes as its second input the first in-phase signal 160.

Similarly, in the second path of the harmonic compensator 132, the second phase quadrature signal 162 is input into the first input port of a multiplier 168, while the voltage 166 read by the voltage transducer 138 is input into second input port of multiplier 168 which in turn produces its output signal on line 174. Similar to the first path, the signal on line 174 enters a conditioning unit 178, the purpose of which is to eliminate all AC components of the output of multiplier 166 and enhance the amplitude level of the desired signal. The conditioning unit 178 produces its output, which is a DC signal reflecting the conditioned amplitude and phase of the ripple on the generated DC power 152.

The signal on line 180 is essentially the DC component of the product of the amplitude of the ripple and the sine of the ripple phase. Likewise, the signal on line 182 is essentially the DC component of the product of the amplitude of the ripple and the cosine of the ripple phase. Taken together, these two DC components form a vector representing the ripple.

The signal on line 182 is then input into the first input port of multiplier 186. The second phase quadrature signal 162 feeds the second input port of multiplier 186 which in turn produces its output on line 190. Summer 192 combines the signals existing on lines 188 and 190 producing a single compensation signal 170 which is equal in frequency, and related in phase and amplitude to the undesired ripple to be suppressed on the generated DC power 152.

The output of summer 192, i.e., the compensation signal 170, serves as an input signal to the voltage regulation control circuit 134 to vary the control current 150 such that the ripple on the generated DC power 152 is suppressed.

Figure 4:
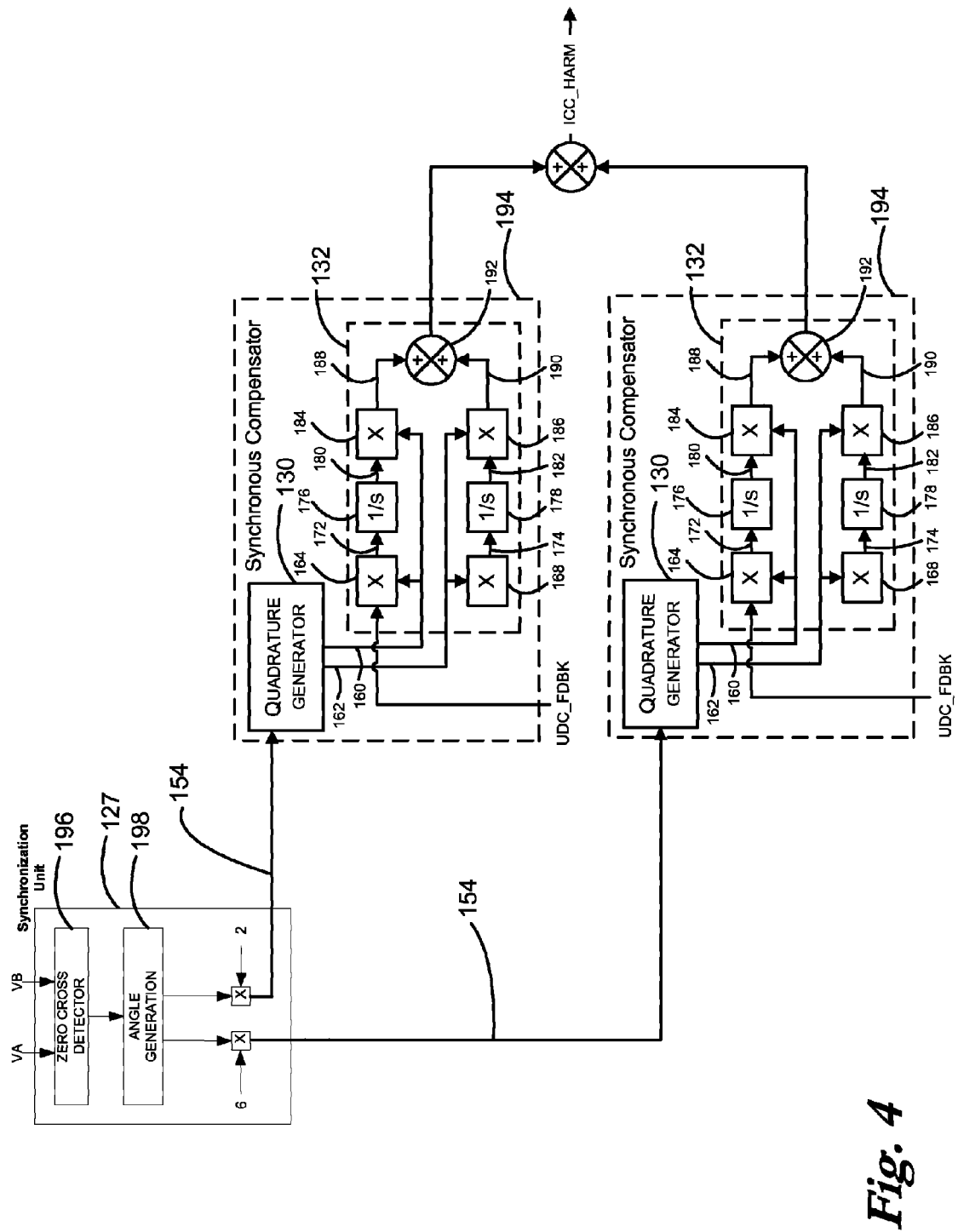
FIG. 4 is a block diagram showing an alternative embodiment to the one described in FIG. 6, wherein the $2^{nd}$ and $6^{th}$ harmonics are suppressed.

It is noted that in the embodiment shown in FIG. 4, multiple harmonic frequencies (the $2^{nd}$ and $6^{th}$ harmonics) in the ripple are suppressed by providing a multiple channel compensation arrangement (i.e., synchronization unit 127) in which each channel responds to a different ripple frequency. Each channel comprises components substantially as shown in FIG. 1, comprising synchronous compensators 194 including a harmonic compensation unit 132 and a quadrature generator 130. Each channel receives a different synchronization signal 154 which corresponds to a different ripple frequency to be suppressed. All channels are then added for modulation control of the variable current source.

Figure 2:
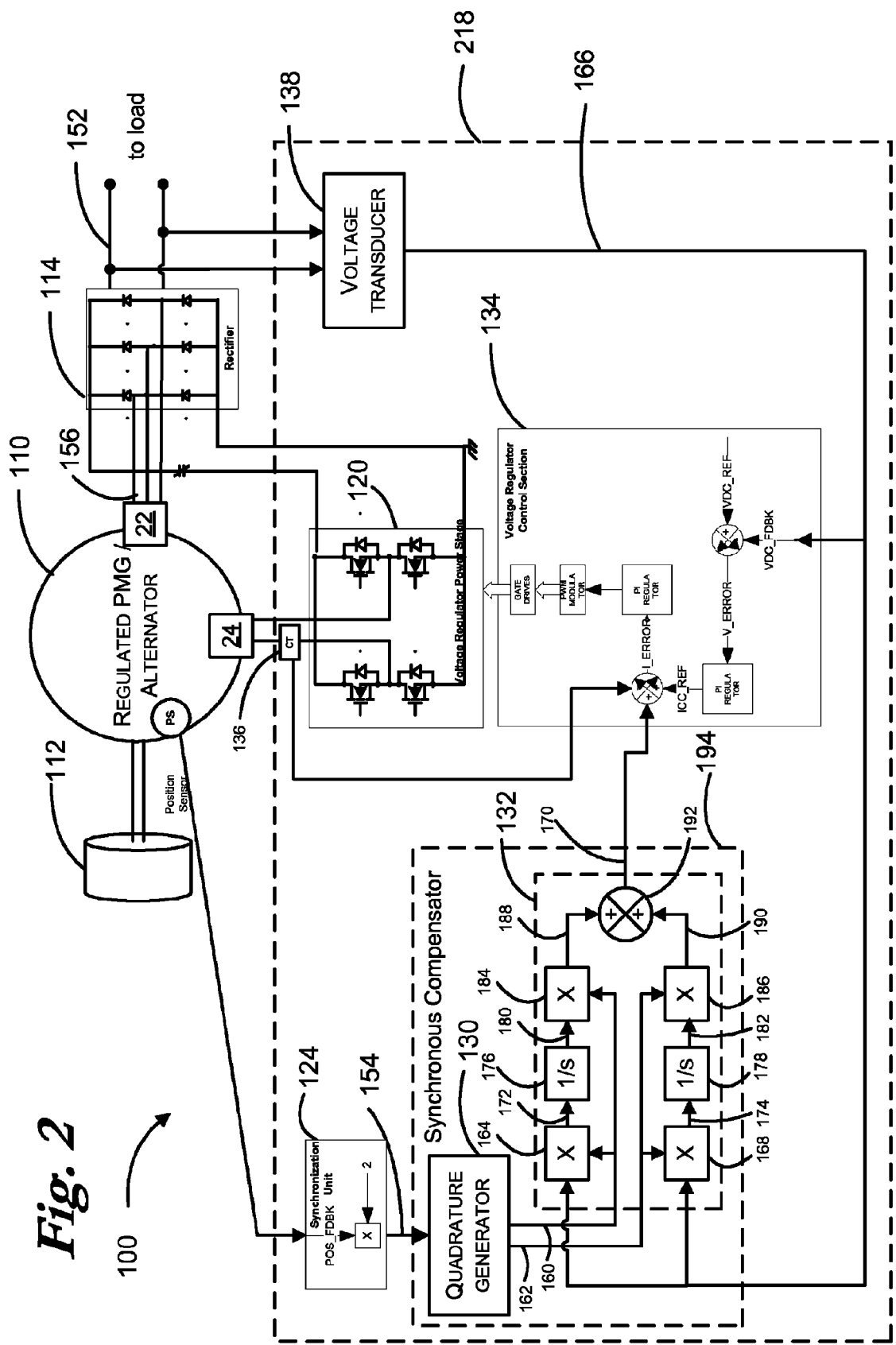
FIG. 2 is a block diagram showing the direct current electric generator including an active ripple suppression circuit of FIG. 1 in more detail.

Now turning to FIG. 2, a block diagram shows the direct current electric generator including an active ripple suppression circuit of FIG. 1 in more detail. Generally, the description of FIG. 1 applies to FIG. 2. The additional components will be well understood by those skilled in the art and will not be further described herein.

Figure 3:
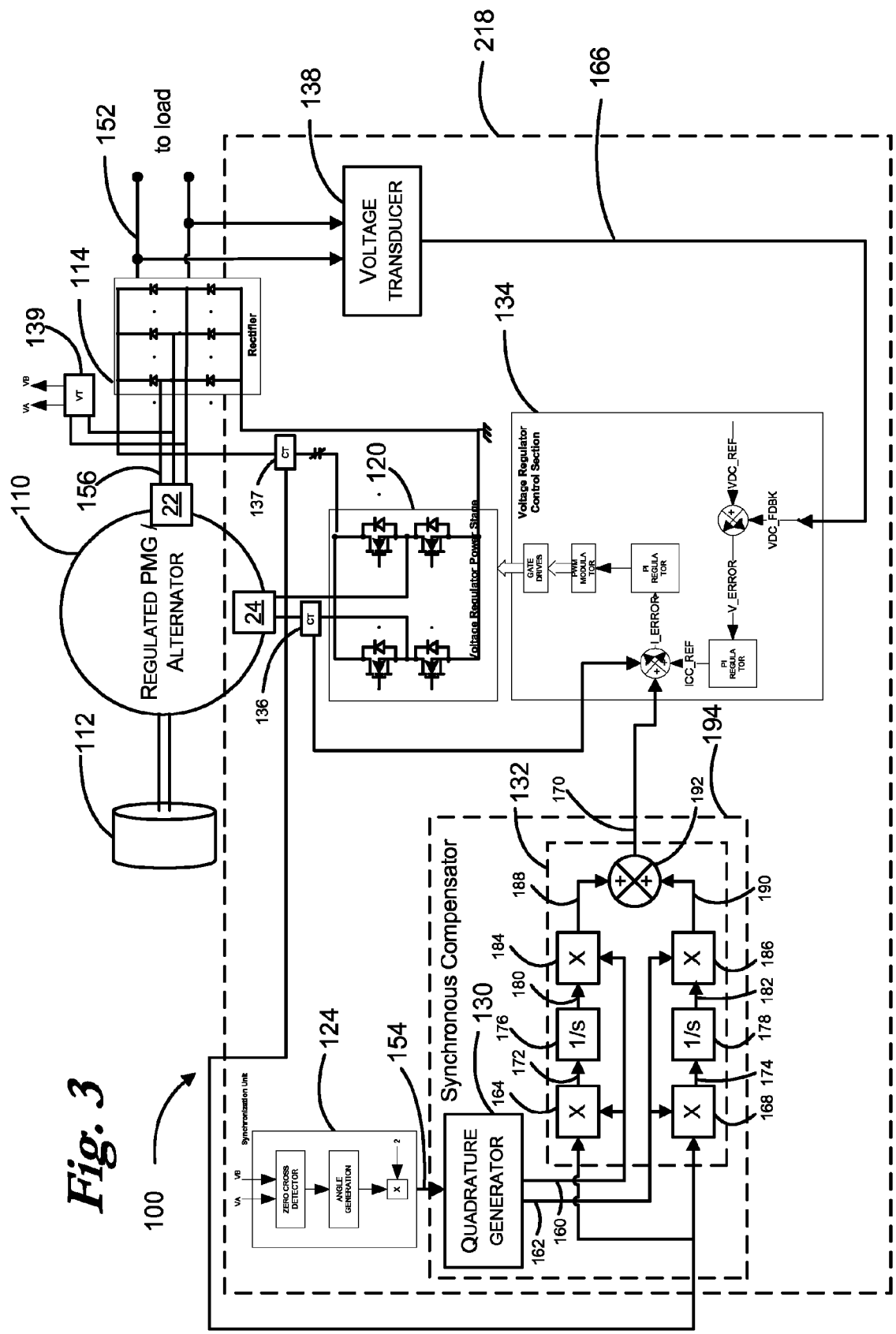
FIG. 3 is a block diagram showing a direct current electric generator including an active ripple suppression circuit, according to another embodiment described herein.

Now turning to FIG. 3, a block diagram shows a direct current electric generator including an active ripple suppression circuit, according to another embodiment described herein. In this embodiment, the phases VA and VB are sampled off the phases of the AC power output from stator of regulated PMG 110. Phases VA and VB are input to synchronization unit 125 which comprises a zero cross detector and an angle generator which operate in a manner well know to those skilled in the art. It is to be noted that FIG. 3 also introduces current transducer 137 which sample the current on the DC bus for inputting to multipliers synchronous compensator 194.

Figure 5:
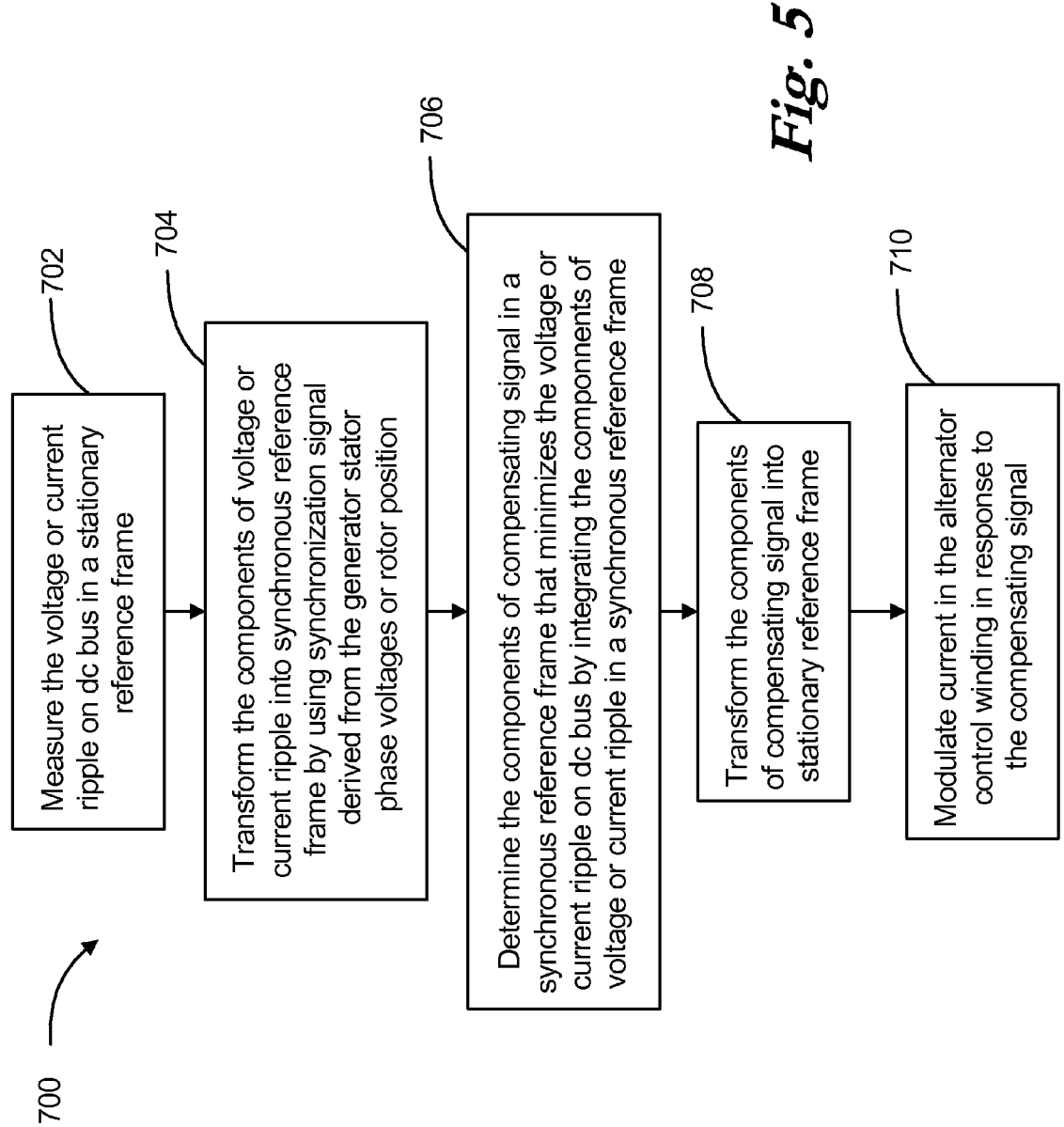
FIG. 5 is a block diagram of a method for reducing a ripple in a direct current power according to an embodiment.

Now turning to FIG. 5, a method is shown for regulating a DC power on a DC bus. The DC power being converted from an AC power (i.e., for reducing a ripple in a DC power) is described. AC power is produced by a regulated permanent magnet generator (PMG) having a control winding. The method 700 comprises: measuring the voltage or current ripple on the dc bus in a stationary reference frame (step 702); transforming the components of voltage or current ripple into synchronous reference frame by using synchronization signal derived from the generator stator phase voltages or rotor position (step 704); determining the components of the compensating signal in a synchronous reference frame that minimizes the voltage or current ripple on the DC bus by integrating the components of the voltage or current ripple in a synchronous reference frame (step 706); transforming the components of the compensating signal into a stationary reference frame (step 708); and modulating the control current in the alternator control winding in response to the compensating signal (step 710). (The step of modulating the control current in the alternator control winding in step 710 is otherwise performed in accordance with the teachings of co-pending U.S. patent application Ser. No. 11/533,548).

The above description is meant to be exemplary only, and one skilled in the art will recognize that certain changes may be made to the embodiments described without departing from the scope of the appended claims.

The invention claimed is:

1. A ripple suppression circuit for regulating direct current (DC) power converted from alternating current (AC) power produced by a regulated permanent magnet generator (PMG) having a control winding, the DC power having voltage or current ripple, the ripple suppression circuit comprising:
    a synchronization unit for deriving a synchronization signal;
    a synchronous compensator for determining, using the synchronization signal, a compensation signal to at least partly suppress the voltage or current ripple; and
    a voltage regulator control unit for producing a current modulation signal for modulating a control current in the control winding in response to the compensation signal to adjust the AC power and hence also to regulate the DC power.

2. The ripple suppression circuit of claim 1, wherein the synchronization unit derives the synchronization signal phase voltages of the stator of the PMG or a position of the rotor of the PMG.

3. The ripple suppression circuit of claim 1, further comprising a voltage or current transducer for respectively measuring the voltage or current ripple in a stationary reference frame.

4. The ripple suppression circuit of claim 1, wherein the synchronous compensator integrates harmonic components of the voltage or current ripple in a synchronous reference frame for determining harmonic components of the compensation signal in a synchronous reference frame and further wherein the voltage regulator control unit produces the current modulation signal in response to the harmonic components of the compensation signal.

5. The ripple suppression circuit of claim 4, wherein the synchronous compensator transforms the harmonic components of the compensation signal into a stationary reference frame.

6. The ripple suppression circuit of claim 1, further comprising a voltage regulator for producing, under control of the current modulation signal, the control current for forwarding to the control winding of the regulated PMG.

7. A ripple suppression circuit for regulating direct current (DC) power converted from alternating current (AC) power produced by a regulated permanent magnet generator (PMG) having a control winding, the DC power having voltage or current ripple, the ripple suppression circuit comprising:
    means for deriving a synchronization signal;
    means for determining, using the synchronization signal, a compensation signal in a synchronous reference frame to at least partly suppress the voltage or current ripple; and
    means for producing a current modulation signal for modulating current in the control winding in response to the compensation signal in order to adjust the alternating current power and hence also to regulate the DC power.

8. A method for regulating direct current (DC) power converted from alternating current (AC) power produced by a regulated permanent magnet generator (PMG) having a control winding, the DC power having voltage or current ripple, the method comprising:
    deriving a synchronization signal;
    determining, using the synchronization signal, a compensation signal in a synchronous reference frame to at least partly suppress the voltage or current ripple; and
    producing a current modulation signal for modulating a control current in the control winding in response to the compensation signal in order to adjust the alternating current power and hence also to regulate the DC power.

9. The method of claim 8, wherein the deriving comprises deriving the synchronization signal from phase voltages of the stator of the PMG or a position of the rotor of the PMG.

10. The method of claim 8, further comprising measuring the voltage or current ripple in a stationary reference frame.

11. The method of claim 8, further comprising integrating harmonic components of the voltage or current ripple in a synchronous reference frame for determining harmonic components of the compensation signal in a synchronous reference frame and further comprising producing the control current modulation signal in response to the harmonic components of the compensation signal.

12. The method of claim 11, further comprising transforming the harmonic components of the compensation signal into a stationary reference frame.

13. The method of claim 8, further comprising producing, under control of the current modulation signal, the current for forwarding to the control winding of the regulated PMG.

14. A direct current electric generator comprising:
a regulated permanent magnet generator (PMG) drivingly connected to a prime mover to produce alternating current power, the regulated PMG comprising control windings through which a control current has an effect on the alternating current power;
a rectifier arranged to convert the alternating current power into direct current power having a voltage or current ripple; and
a ripple suppression circuit for regulating the direct current power, the ripple suppression circuit comprising:
a synchronization unit for deriving a synchronization signal;
a synchronous compensator for determining, using the synchronization signal, a compensation signal to at least partly suppress the voltage or current ripple; and
a voltage regulator control unit for producing a current modulation signal for modulating current in the control winding in response to the compensation signal in order to adjust the alternating current power and hence also to regulate the DC power.

\* \* \* \* \*